(12) United States Patent  
Thompson

(10) Patent No.: US 7,797,916 B2  
(45) Date of Patent: Sep. 21, 2010

(54) SYSTEMS AND METHODS FOR HARVESTING COTTON

(76) Inventor: Randy Thompson, 8794 Denham Rd., Sycamore, GA (US) 31790

( * ) Notice: Subject to any disclaimer, the term of this patent is extended or adjusted under 35 U.S.C. 154(b) by 481 days.

(21) Appl. No.: 11/336,176

(22) Filed: Jan. 20, 2006

(65) Prior Publication Data

US 2006/0162307 A1    Jul. 27, 2006

Related U.S. Application Data

(60) Provisional application No. 60/646,706, filed on Jan. 25, 2005, provisional application No. 60/648,442, filed on Feb. 1, 2005.

(51) Int. Cl.  
*A01D 46/08* (2006.01)

(52) U.S. Cl. .............................. 56/30; 56/28

(58) Field of Classification Search ......... 56/12.8–13.2, 56/28, 30–32, DIG. 8  
See application file for complete search history.

(56) References Cited

U.S. PATENT DOCUMENTS

| | | | | |
|---|---|---|---|---|
| 830,102 | A * | 9/1906 | Richmond ................. | 56/13.1 |
| 1,460,463 | A * | 7/1923 | Williams .................... | 209/643 |
| 1,646,594 | A * | 10/1927 | Phelps et al. .................... | 56/41 |
| 2,247,472 | A * | 7/1941 | Bible .......................... | 55/294 |
| 2,271,793 | A * | 2/1942 | Curley et al. ................... | 19/89 |
| 2,355,880 | A | 8/1944 | Macha | |
| 2,493,564 | A * | 1/1950 | Arneson ....................... | 56/50 |
| 2,763,978 | A * | 9/1956 | Graham et al. ................. | 56/30 |
| 2,785,522 | A * | 3/1957 | McKenzie ..................... | 56/31 |
| 2,798,351 | A * | 7/1957 | Dobson ....................... | 56/13.2 |
| 3,410,066 | A * | 11/1968 | Boynton et al. ................ | 56/30 |
| 3,421,301 | A * | 1/1969 | Boynton et al. ................ | 56/30 |
| 3,618,761 | A | 11/1971 | Francis et al. | |
| 3,813,857 | A | 6/1974 | Harrington | |
| 3,964,242 | A | 6/1976 | Stone | |
| 4,027,464 | A | 6/1977 | Stone | |
| 4,501,112 | A | 2/1985 | Thedford et al. | |
| 4,704,851 | A | 11/1987 | Manor | |
| 4,875,330 | A | 10/1989 | Deutsch et al. | |
| 4,928,459 | A | 5/1990 | Thedford et al. | |
| 5,036,649 | A | 8/1991 | Thedford et al. | |
| 5,094,064 | A | 3/1992 | Thedford | |
| 5,325,656 | A * | 7/1994 | Schreiner et al. ......... | 56/10.2 H |
| 5,406,779 | A * | 4/1995 | Deutsch et al. ................ | 56/32 |
| 6,205,756 | B1 | 3/2001 | Orsborn et al. | |
| 6,672,041 | B1 | 1/2004 | Keeter | |
| 6,907,718 | B2 | 6/2005 | Haverdink | |

* cited by examiner

*Primary Examiner*—Thomas B Will  
*Assistant Examiner*—Mai T Nguyen  
(74) *Attorney, Agent, or Firm*—Thomas, Kayden, Hostemeyer & Risley, LLP.

(57) ABSTRACT

Systems for harvesting cotton from plants are provided. In this regard, a representative system incorporates an extracting zone and nozzles. The extracting zone is operative to receive therein stalks of plants from which cotton is to be removed. The nozzles are operative to direct vacuum pressure toward the stalks of the plants received within the extracting zone such that cotton is removed from the stalks and drawn into the nozzles. The nozzles also are operative to move relative to the extracting zone.

9 Claims, 10 Drawing Sheets

SYSTEMS AND METHODS FOR HARVESTING COTTON

CROSS REFERENCE TO RELATED APPLICATIONS

This application is a utility application that claims the benefit of and priority to U.S. Provisional Application Ser. No. 60/646,706, filed on Jan. 25, 2005 and U.S. Provisional Application Ser. No. 60/648,442, filed on Feb. 1, 2005, each of which is incorporated herein by reference.

BACKGROUND OF THE INVENTION

1. Field of the Invention

The invention relates generally to agricultural implements for the harvesting of cotton.

2. Related Art

For many decades, cotton has been harvested with a complex header that includes numerous moving parts. Each row harvester has individual headers that incorporate a framework, a PTO drive system, numerous sprockets and chains, vertical bars to house numerous spindles, doffers and moistener pads, pressure doors, and various contraptions that work together to remove the lint from the burrs of cotton stalks. Unfortunately, since such systems require lubricant and water to operate, the cotton tends to become contaminated to some extent.

For such a system to operate effectively, intensive maintenance typically is required. This is primarily due to the harsh operating environment and the number of moving parts that tend to wear. Thus, overhauls are frequently required. Since many of the parts are precision made with close tolerances, such an overhaul can be a large financial undertaking. Additionally, frequent cleaning also is required. However, since such cleaning is seldom performed without strict supervision, cleaning costs also tend to be quite high.

Furthermore, the complexity of the aforementioned headers typically results in a very heavy system. This typically results in fewer headers being carried per harvester, which limits the number of rows of cotton that can be harvested at a time. Increased weight also can increase compaction of soil, which is an undesirable consequence for modern conservation practices.

SUMMARY

Systems and methods for harvesting cotton from plants are provided. In this regard, an exemplary embodiment of a system comprises an extracting zone and nozzles. The extracting zone is operative to receive therein stalks of plants from which cotton is to be removed. The nozzles are operative to direct vacuum pressure toward the stalks of the plants received within the extracting zone such that cotton is removed from the stalks and drawn into the nozzles. The nozzles also are operative to move relative to the extracting zone.

Another embodiment of a system for harvesting cotton from plants comprises an extracting zone, a first drum, a second drum and a source of vacuum pressure. The extracting zone is operative to receive therein stalks of plants from which cotton is to be removed. The first drum is mounted adjacent the extracting zone. The first drum has first openings located on an exterior surface thereof, with the first openings being sized and shaped to receive cotton therethrough. The first drum is operative to rotate such that sequential ones of the first openings are directed toward the extracting zone. The second drum also is mounted adjacent the extracting zone. The second drum has second openings located on an exterior surface thereof, with the second openings being sized and shaped to receive cotton therethrough. The second drum is operative to rotate such that sequential ones of the second openings are directed toward the extracting zone. The source of vacuum pressure is operative to direct vacuum pressure, via the first openings and the second openings, toward the stalks of the plants received within the extracting zone such that cotton is removed from the stalks, drawn through the first openings and second openings and into the first drum and second drum, respectively.

An exemplary embodiment of a method for harvesting cotton from plants comprises directing vacuum pressure, at continuously varying angles, toward the stalks of the plants such that cotton is drawn from the plants by the vacuum pressure.

Other systems, methods, features and/or advantages of the present invention will be or may become apparent to one with skill in the art upon examination of the following drawings and detailed description. It is intended that all such additional systems, methods, features and/or advantages be included within this description, be within the scope of the present invention, and be protected by the accompanying claims.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION

Figure 1:
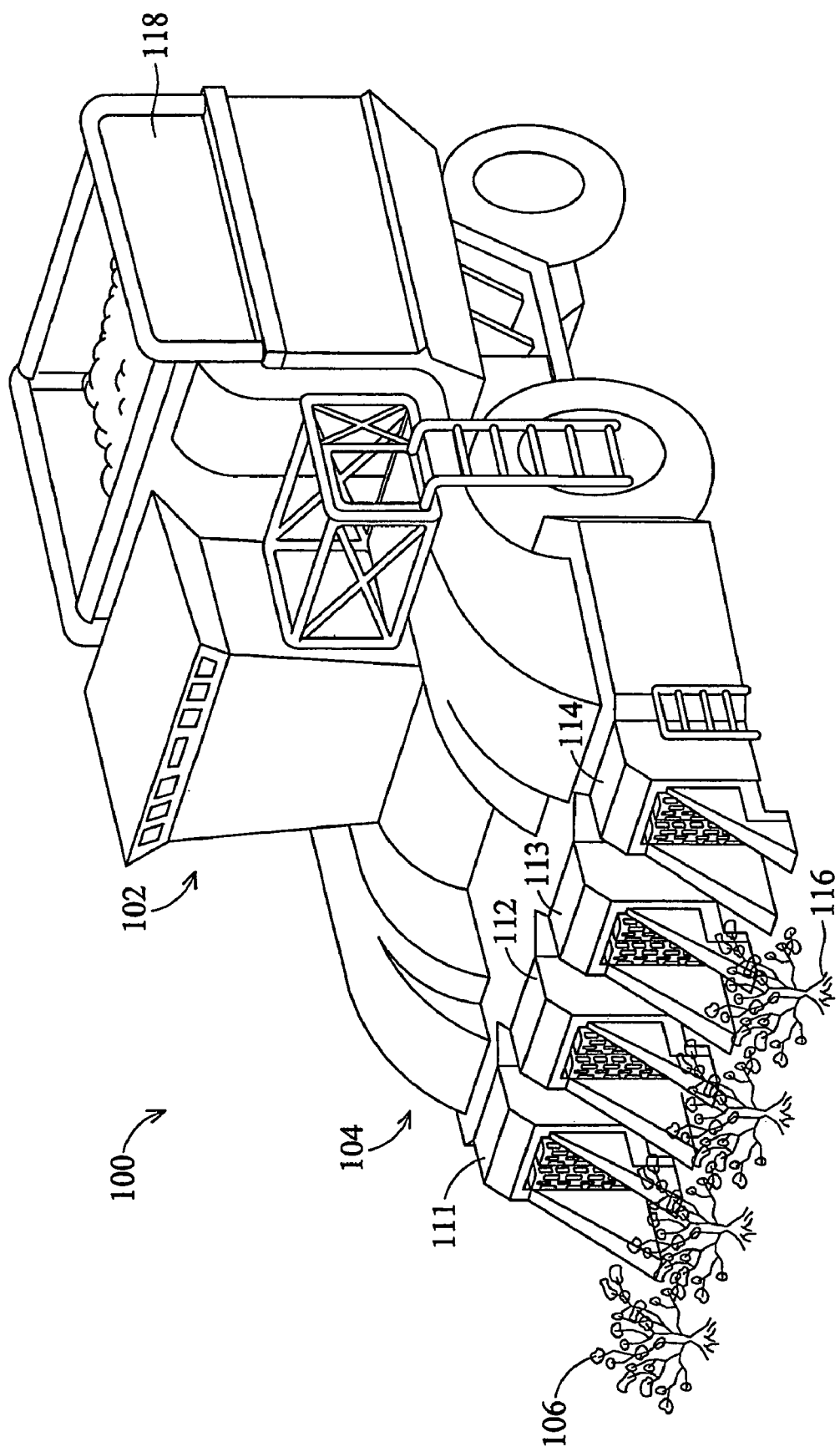
FIG. 1 is a perspective view of an embodiment of a system for harvesting cotton.

Systems and methods for harvesting cotton are provided, exemplary embodiments of which will now be described in detail. In this regard, FIG. 1 is a perspective view of an embodiment of a system for harvesting cotton 100. As shown in FIG. 1, this embodiment incorporates a self-propelled implement or harvester 102. The harvester mounts a pneumatic cotton-harvesting header assembly 104 that is used to extract cotton from rows of cotton plants 106 by vacuum pressure or suction. In particular, the header assembly includes one or more headers. In this embodiment, four such headers (111, 112, 113 and 114) are used. Each header includes an extracting zone that is capable of directing vacuum pressure toward the cotton of a cotton plant.

Figure 2:
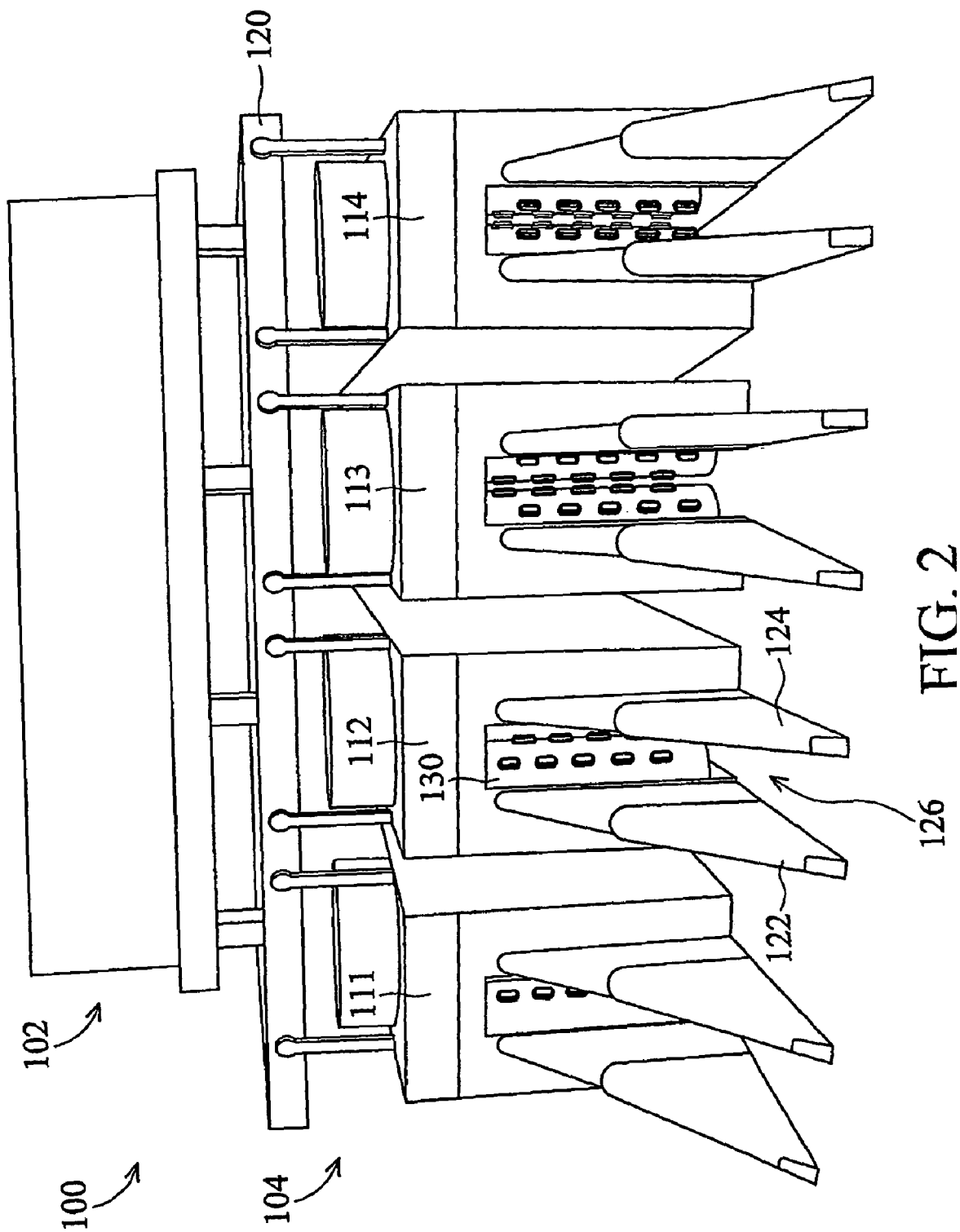
FIG. 2 is a perspective view of the embodiment of FIG. 1, showing detail of the plant lifters and entrances of the cotton extracting zones.

In operation, the harvester is driven so that a row of cotton will enter a header of the header assembly. By way of example, in FIG. 1, cotton plant 116 is aligned with header 114. As the harvester is driven along the rows of cotton plants, the cotton plants travel through the headers, where vacuum pressure is directed. This vacuum pressure extracts the cotton from the cotton plants. The cotton is then collected, such as by being directed to a bin, e.g., bin 118. A more detailed view of the header assembly of the embodiment of FIG. 1 is shown in FIG. 2 As shown in FIG. 2, header assembly 104 incorporates a support frame 120 that is used to mount the four headers. The headers include plant lifters that are used to direct the plants into the entrance of the headers. In this embodiment, each header incorporates a generally wedge-shaped pair of plant lifters, with one being arranged on each side of the entrance of each of the headers. By way of example, header 112 includes plant lifters 122 and 124, each of which is located adjacent a side of the entrance 126 of the header. Also visible in FIG. 2 are the bodies, e.g., body 130, that are used to direct vacuum pressure toward the cotton of the cotton plants as the cotton plants pass through the headers.

Figure 3:
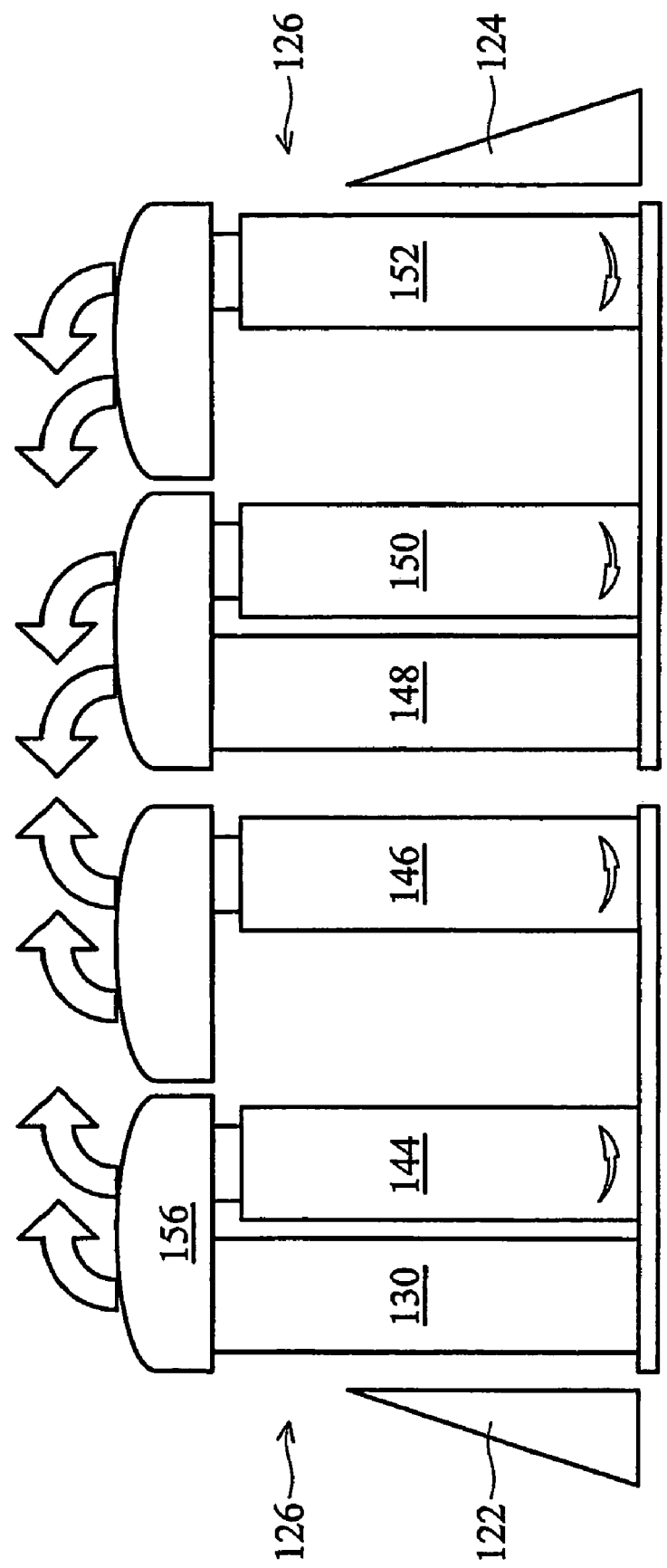
FIG. 3 is a schematic view of an embodiment of a system for harvesting cotton, showing detail of the extracting zone and associated components.

As shown schematically in FIG. 3, each header includes several bodies that are located adjacent to an extracting zone. Note that in FIG. 3, a representative header is opened along its length to expose the interior of the header. Thus, in reality, the plant lifter on the far left of FIG. 3 and the plant lifter on the far right of FIG. 3 would be located next to each other.

In FIG. 3, the bodies are depicted as drums, i.e., generally cylindrical bodies, however, various other shapes of bodies can be used in other embodiments. Specifically, rotating and stationary drums are depicted. Each of these drums is capable of directing vacuum pressure to an extracting zone that is located between the drums. In this regard, one side of the extracting zone is defined by stationary drum 130 and rotating drums 144 and 146, and the other side of the extracting zone is defined by stationary drum 148 and rotating drums 150 and 152.

The drums pneumatically communicate with one or more vacuum sources, such as vacuum source 156. So configured, as a cotton plant is directed into the extracting zone, the drums direct the vacuum pressure provided by the vacuum source to the cotton plant thereby removing at least some of the cotton from the plant. The extracted cotton is drawn into the drums and directed for collection, such as described before. Note that in this embodiment, the rotating drums rotate in directions that correspond to movement of the cotton plants through the extracting zone and as indicated by the arrows located at the lower portions of the drums.

Figure 4:
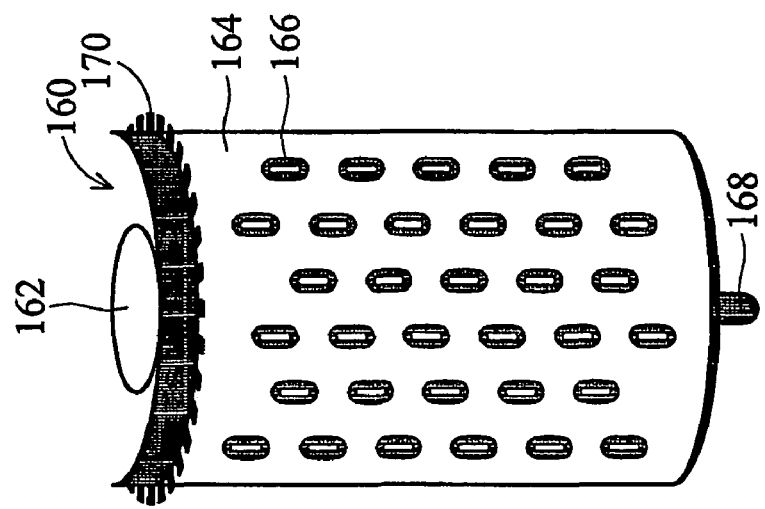
FIG. 4 is a schematic side view of an embodiment of an outer drum of a rotating drum assembly, with the exterior surface laid open for ease of description.

An embodiment of a rotating body (in this case a rotating drum) will now be described in greater detail with respect to FIGS. 4-6. As shown in FIG. 4, a rotating outer drum 160 is depicted in a laid open configuration, i.e., the exterior of the drum has been partially detached and unwrapped so that the entire exterior is visible. The rotating outer drum 160 is a generally cylindrical structure that defines a hollow interior 162. The exterior 164 of the drum incorporates a series of openings, such as opening 166. The openings are located at various positions about the exterior to facilitate extraction of cotton from plants of various sizes and shapes. Therefore, the openings are generally provided at spaced intervals and at varying heights along the exterior. Note that each of the openings also has a nozzle mounted adjacent thereto, as will be described in detail below.

Figure 7:
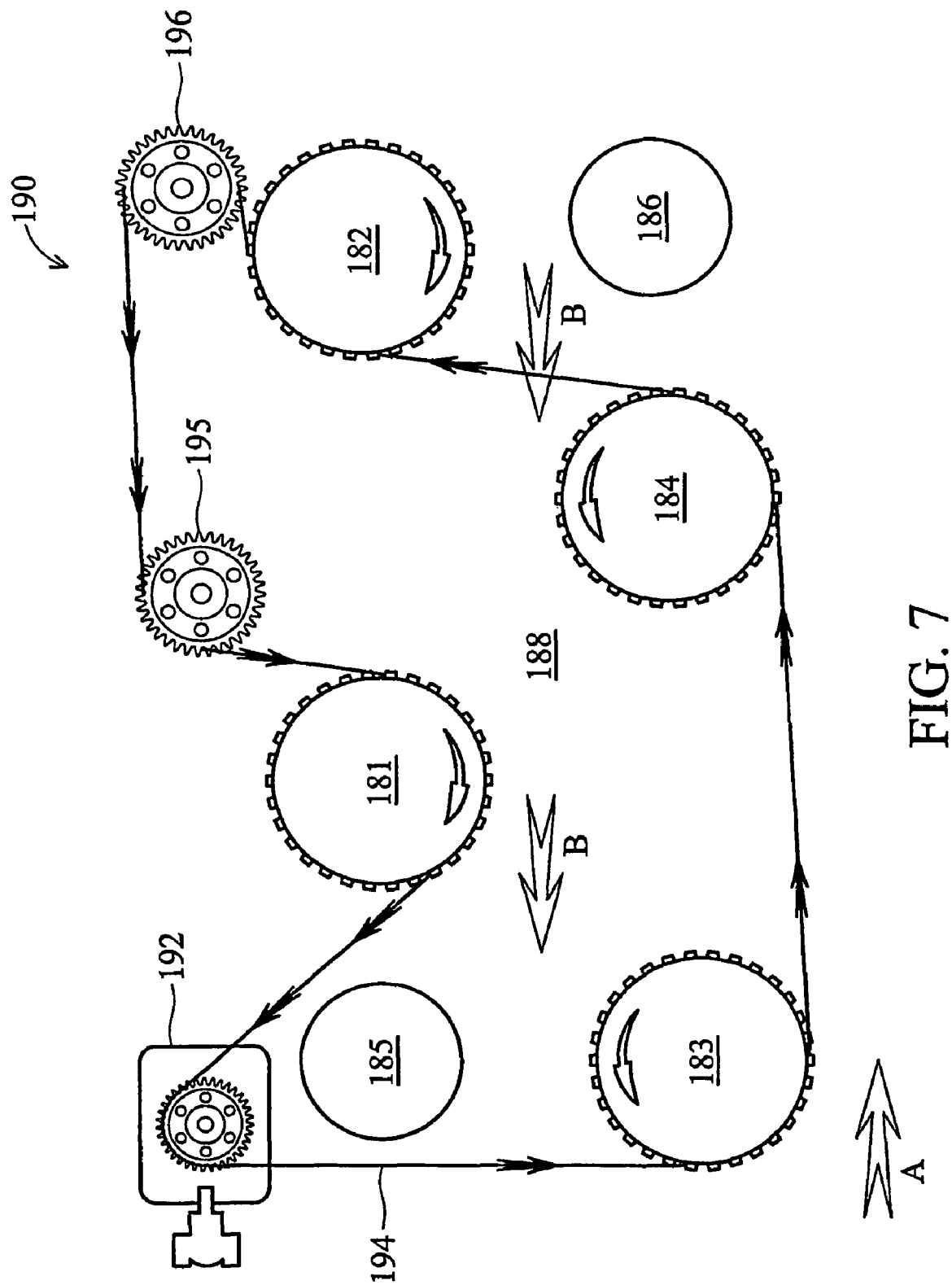
FIG. 7 is a schematic top view of an embodiment of a cotton extracting zone with associated drums and drive assembly.

In this embodiment, rotation of the outer drum 160 is facilitated by a hollow shaft 168 that is affixed to one end of the drum. The shaft 168 enables the drum to be rotatably mounted to a frame (not shown). A gear 170 also is attached. The gear is configured to engage a drive, such as depicted in FIG. 7. In operation, the drum rotates about a longitudinal axis defined by the shaft 168.

Figure 5:
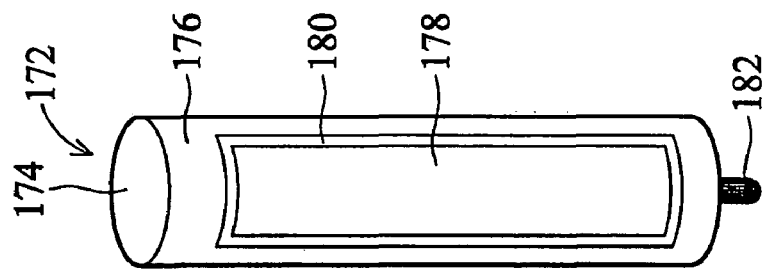
FIG. 5 is a schematic side view of an embodiment of an inner drum of a rotating drum assembly.

FIG. 5 depicts an embodiment of an inner body (in this case, an inner drum) that is used to provide vacuum pressure to the openings of an outer body. Specifically, inner drum 172 is a generally cylindrical structure that defines a hollow interior 174. The exterior 176 of the inner drum incorporates an elongate opening 178 that is surrounded by a seal 180.

A threaded shaft 182 is affixed to one end of inner drum 172. The shaft 182 is configured to be inserted into the hollow of shaft 168, thereby positioning the inner drum within the outer drum as depicted in FIG. 6. A bolt then is used to secure the shaft 182 in place.

Figure 6:
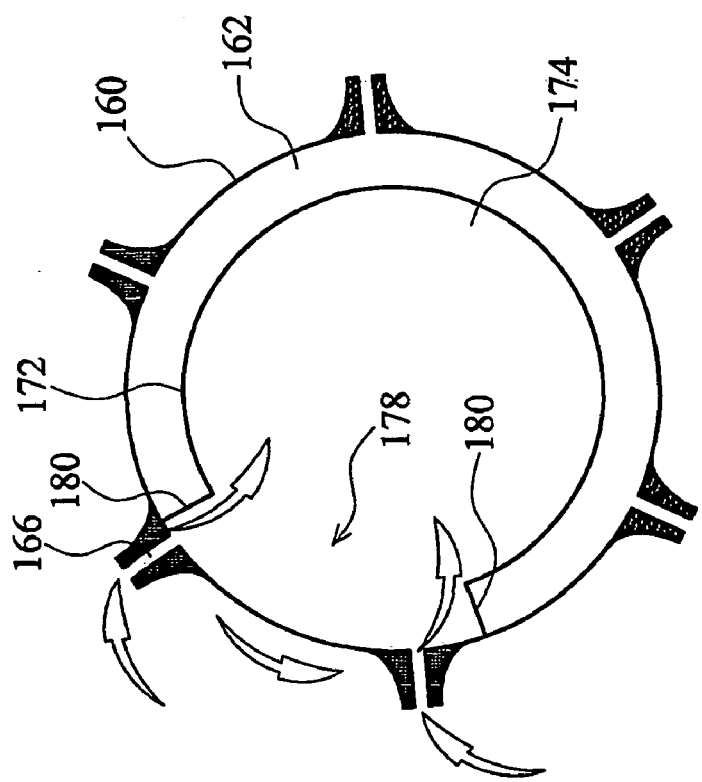
FIG. 6 is a schematic top view of the embodiment rotating drum assembly of FIGS. 4 and 5, with the inner and outer drums assembled.

As shown in FIG. 6, the outer drum 160 rotates about the inner drum 172 so that the opening 178 of the inner drum remains positioned adjacent the extracting zone. In this manner, cooperation of the inner drum, seal and outer drum causes vacuum pressure only to be directed to openings of the outer drum as those openings pass by the extracting zone. Note that in this embodiment, the outer drum rotates against the direction of motion of the cotton plants through the extracting zone.

FIG. 7 is a schematic top view of an embodiment of a cotton extracting zone with associated drums. In this embodiment, rotating drums 181, 182, 183 and 184, and stationary drums 185 and 186 are located adjacent an extracting zone 188. The rotating drums are driven by an integrated drive system 190 that incorporates a gear box 192, a drive chain or belt 194 interconnecting the drums, and optional idler gear, e.g., idler gears 195, 196, for ensuring the proper direction of rotation of the drums. In operation, the gear box receives power from the transmission of the implement to which the system is installed, thereby ensuring that rotation of the drums is synchronized with the speed of travel of the implement (indicated by arrow A). Notably, the direction of rotation of each of the drums and the speed of rotation of the drums can be adjusted as desired. By way of example, in some embodiments, the drums can be rotated in an overspeed condition such that the drums rotate faster than the implement is travelling along the various rows of cotton plants. In this overspeed condition, cotton may be mechanically urged into the nozzles of the rotating drums, thus positioning the cotton for more effective extraction. Notably, the cotton plants move through the extracting zone 188 as indicated by arrows B.

Figure 9:
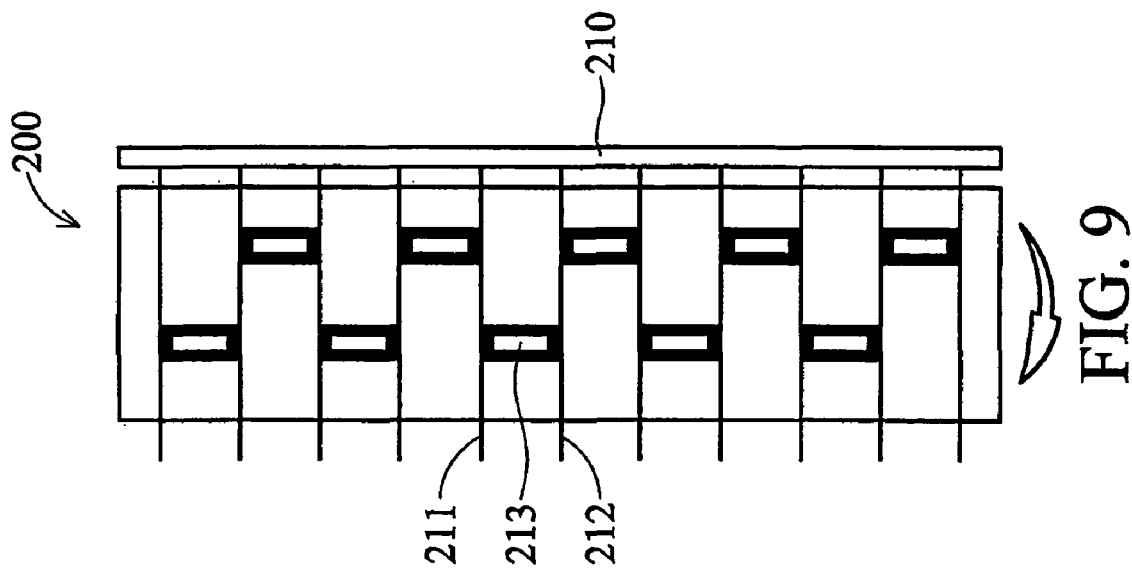
FIG. 9 is a schematic side view of the embodiment of FIG. 8, showing detail of one of the rotating drums and associated shield.
Figure 8:
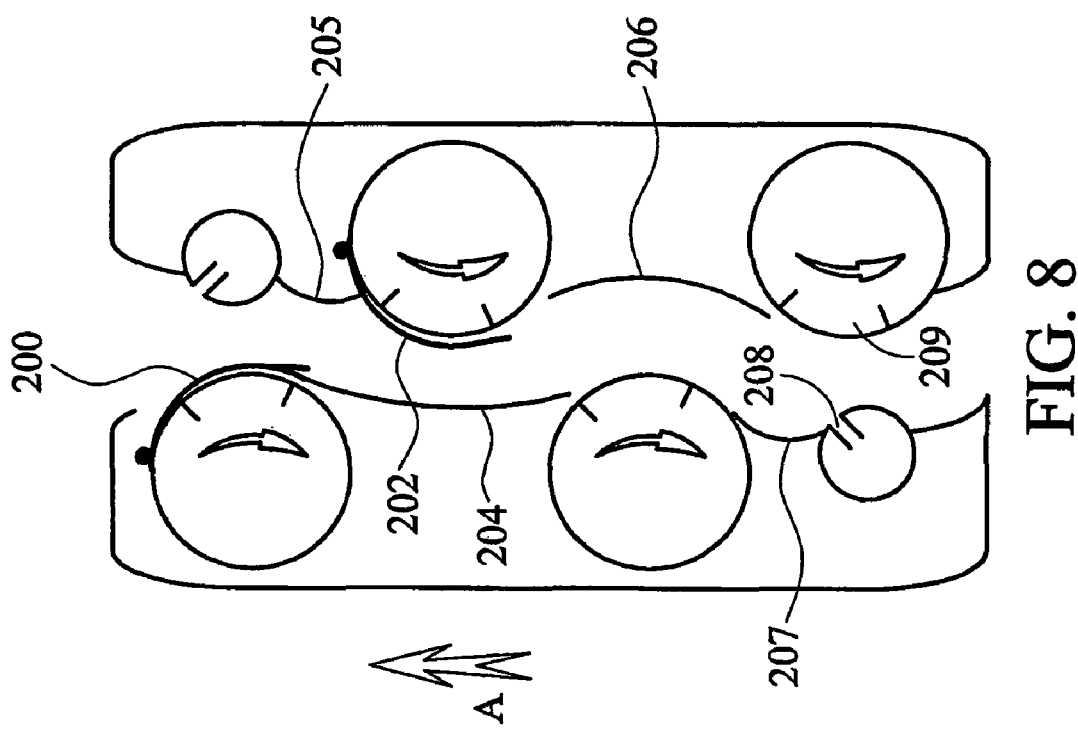
FIG. 8 is a schematic top view of an embodiment of a cotton extracting zone with associated drums.

Another feature that can be incorporated in various embodiments is depicted schematically in FIGS. 8 and 9. In particular, these figures depict the use of shields that can be used to direct the cotton plants through an extracting zone. As shown in FIG. 8, several shields are used to define a circuitous path through the extracting zone. In particular, this embodiment incorporates drum shields 200 and 202, for example, that are generally located about a portion of a drum, and path shields 204, 205, 206 and 207, for example, that extend between drums. The shields not only tend to direct the cotton plants through the extracting zone and prevent large debris, e.g., sticks, from entering the openings of the drums, but tend to limit the number of openings that are exposed to the cotton at any given time. In this manner, the openings are given time to be cleared of extracted cotton, thus potentially preventing fouling of the openings. Note that FIG. 8 also indicates the general directions in which vacuum pressure is directed in this embodiment, such as indicated by the openings 208, and 209, for example.

The embodiment of the shield 200 is depicted in greater detail in FIG. 9. In this embodiment, the shield is formed of a post 210 from which extends multiple curved arms, e.g., arms 211 and 212. The arms are positioned so that the openings of the drum with which they are associated are located between adjacent ones of the arms. By way of example, opening 213 is generally located between arms 211 and 212. The arms can be formed of various materials and in various shapes. In this embodiment, the arms are curved metal rods.

Figure 10:
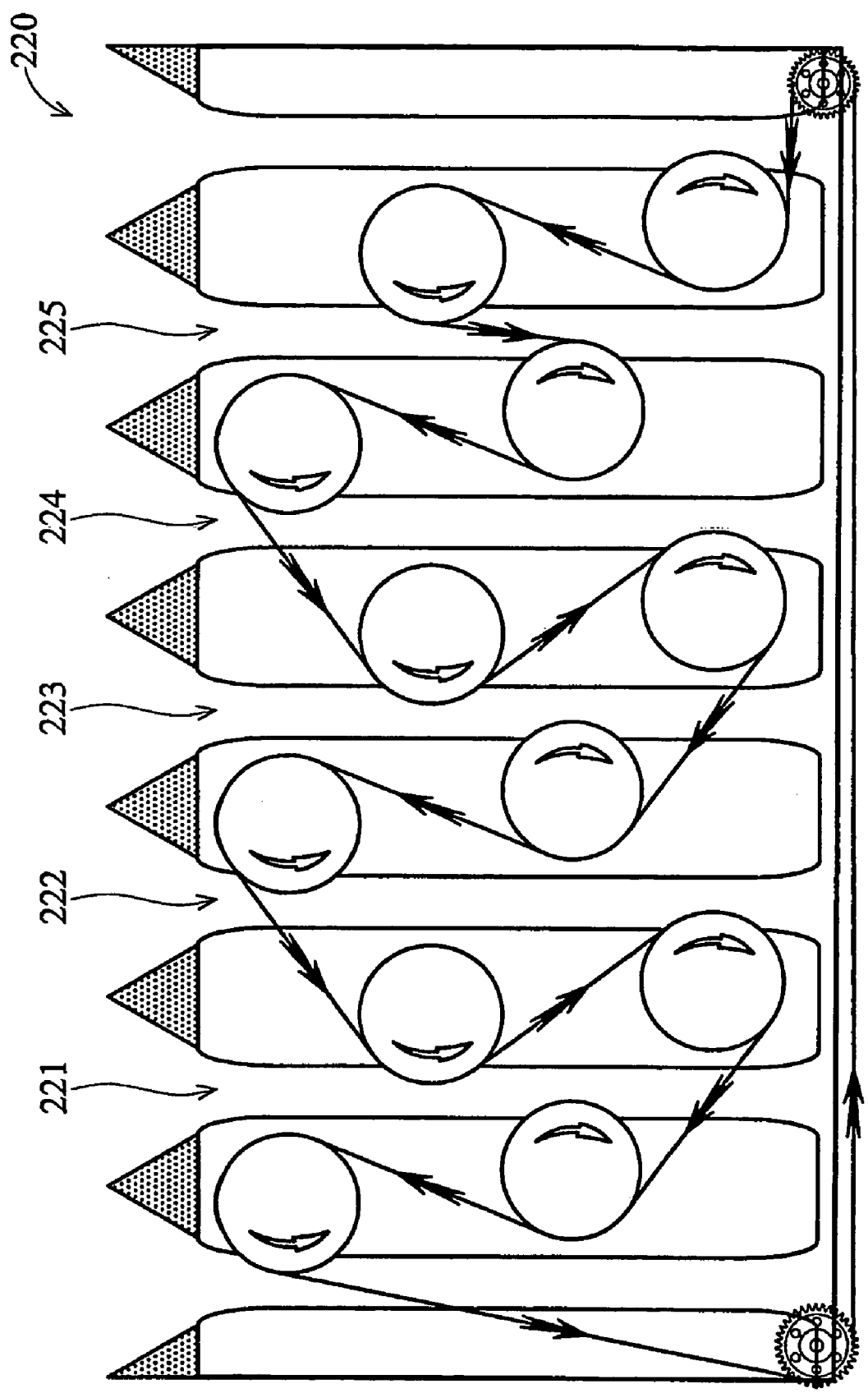
FIG. 10 is a schematic top view of another embodiment of a header assembly incorporating multiple cotton extracting zones with associated drums.

FIG. 10 is a schematic top view of another embodiment of a header assembly incorporating multiple cotton extracting zones with associated drums. In particular, header assembly 220 incorporates five extracting zones, i.e., zones 221, 222, 223, 224 and 225. Each of these zones includes a set of opposing rotating drums. Notably, a single drive assembly is used for rotating the drums of the entire header assembly.

Figure 11:
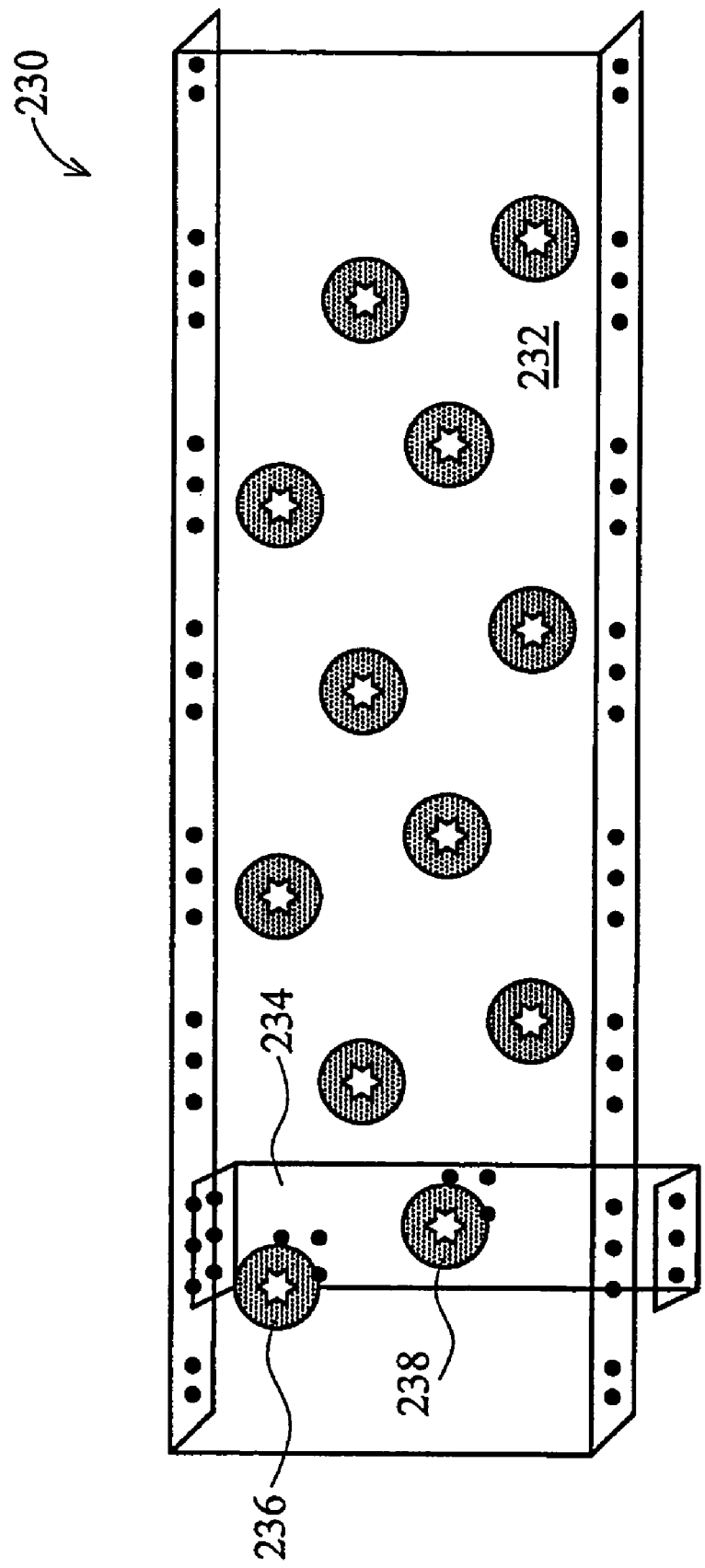
FIG. 11 is a schematic top view of the support frame of the embodiment of FIG. 10.

Another aspect of the embodiment of FIG. 10 is that only rotating drums are used. In this regard, mounting of the various rotating drums is facilitated by a frame support as shown in FIG. 11. As shown in FIG. 11, frame support 230 incorporates a lower support 232 that is generally configured as a metal plate. An upper support or bracket 234 attaches to the lower support such that the drums located therebetween are secured in place. Notably, this embodiment uses a separate upper support for supporting two drums. For instance, upper support 234 secures drums 236 and 238. However, in other embodiments, various other configurations could be used.

Figure 12:
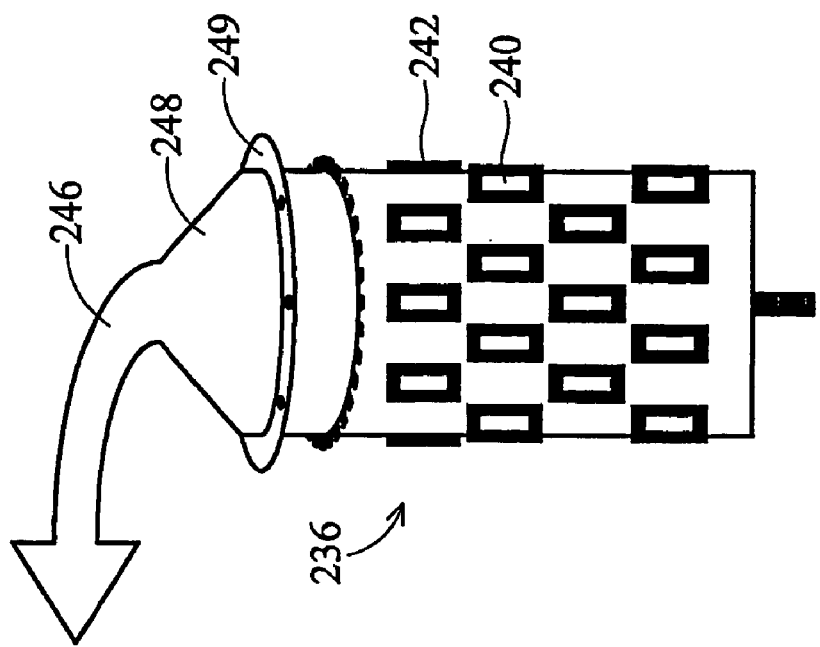
FIG. 12 is a schematic side view of a rotating drum assembly of the embodiment of FIG. 10.

FIG. 12 is a schematic side view of a rotating drum assembly of the embodiment of FIG. 10. In particular, FIG. 12 schematically depicts drum 236. In this regard, drum 236 incorporates multiple openings, such as opening 240 for directing vacuum pressure toward an extracting zone for extracting cotton. As will be described in detail below, each of the openings can be associated with a nozzle, such as nozzle 242 shown extending outwardly from the drum 236.

As also shown in FIG. 12, vacuum pressure is provided to a drum 236 via ductwork 246 that pneumatically couples vacuum pressure to the interior of the drum. In this embodiment, the ductwork incorporates a generally funnel-shaped connector 248 that connects to the drum using a flange 249.

Figure 13:
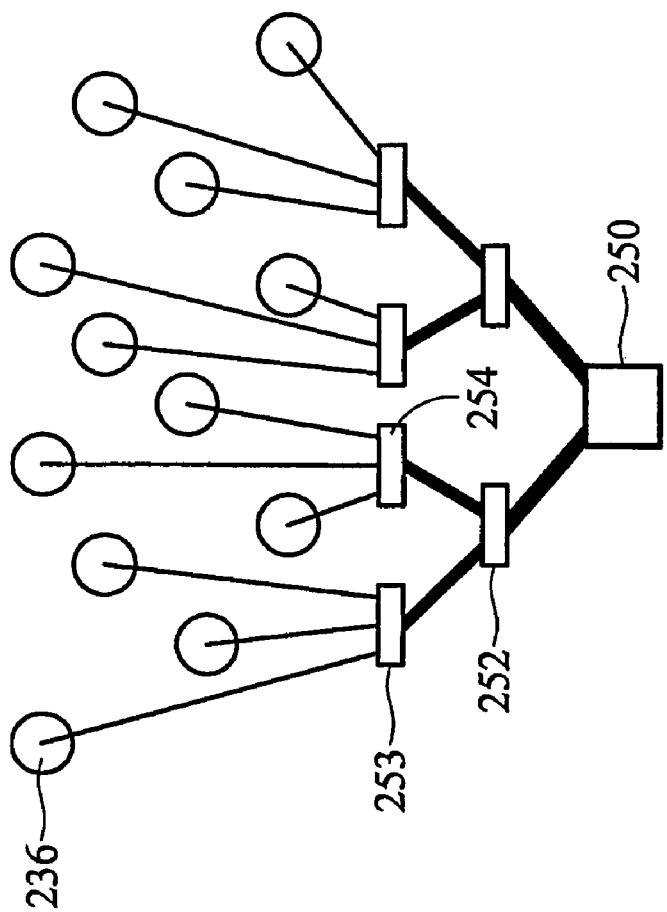
FIG. 13 is a schematic diagram showing interconnection of the source of vacuum pressure to the various manifolds and drums of the embodiment of FIG. 10.

In this regard, FIG. 13 is a schematic diagram showing interconnection of the source of vacuum pressure to the various manifolds and drums of the embodiment of FIG. 10. Notably, as in this embodiment, only one vacuum source 250 is used to provide vacuum pressure to multiple drums, e.g., drum 236. Specifically, vacuum pressure is provided from the source, through vacuum manifolds that direct the vacuum pressure to the drums. Notably, multiple manifolds are used, at least some of which merely route vacuum pressure to other manifolds. For example, manifold 252 routes vacuum pressure to manifolds 253 and 254. In other embodiments, different arrangements can be used, such as arrangements that incorporate a different vacuum source for each drum or a subset of drums, for example.

Additionally, various vacuum sources can be used. By way of example, fans (such as centrifugal fans) or various types of air pumps can be used to provide the vacuum pressure for extracting the cotton. These vacuum sources also can be used to provide positive pressure at their exit ports for directing the extracted cotton to collection bins, for example. Typically, the positive pressure would be routed through ductwork for conveying the cotton. In other embodiments, separate sources of vacuum and positive pressure can be used.

Figure 15:
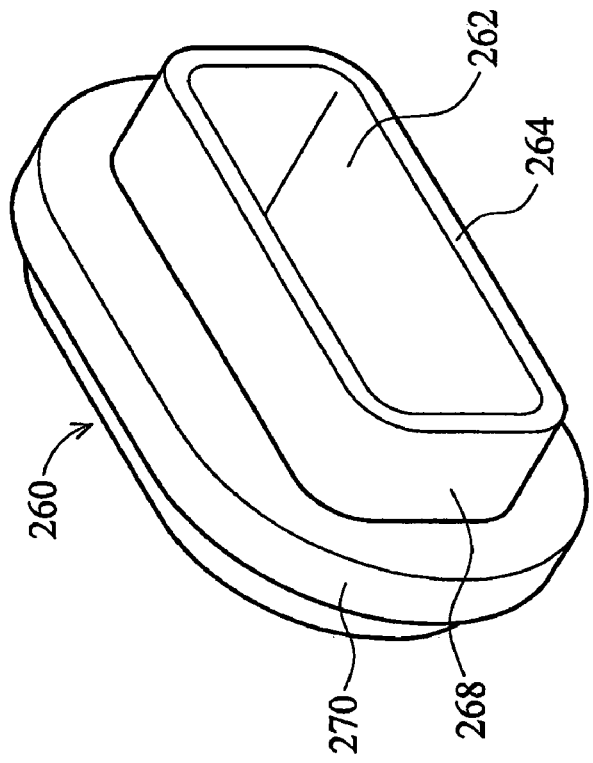
FIG. 15 is a schematic view of another side of the embodiment of the nozzle of FIG. 14.
Figure 14:
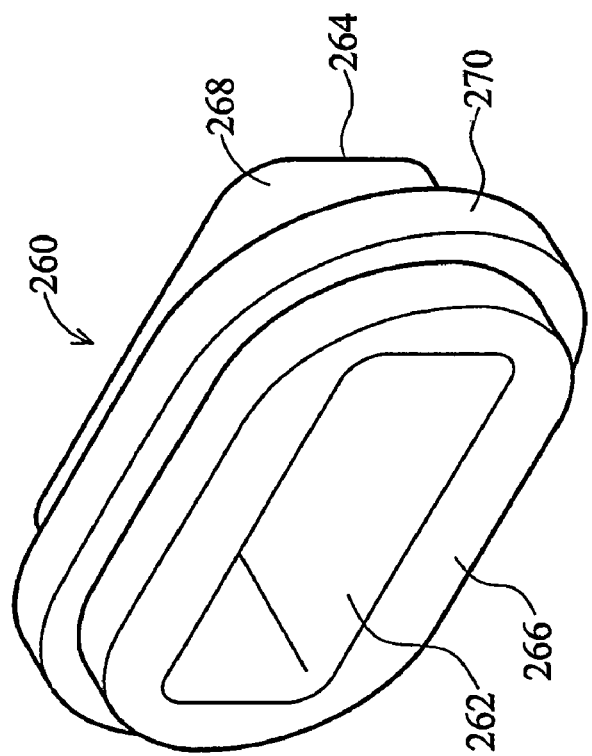
FIG. 14 is a perspective view of an embodiment of a nozzle that can be mounted to a rotating drum.

As mentioned before, nozzles can be associated with the openings of the outer bodies and/or stationary bodies to facilitate cotton extraction. In this regard, FIGS. 14 and 15 depict an embodiment of such a nozzle. As shown in FIGS. 14 and 15, nozzle 260 includes a nozzle opening 262 that extends from an outer lip 264 to a throat 266. The outer lip is a terminating end of a protrusion 268 that extends outwardly from a base 270. In some embodiments, an upper surface of the base seats flush with the exterior surface of the drum to which the nozzle is attached.

The nozzle is configured to be received within the opening of a drum and is operative to direct vacuum pressure, provided to an interior of the drum, toward the corresponding extracting zone. In some embodiments, the nozzles can accelerate the air flowing therethrough, thereby enhancing the effectiveness of the vacuum pressure. The nozzles also tend to prevent entry of burr and other debris into the interior of a drum while potentially enhancing cotton extraction by mechanically impinging the cotton as the drum rotates adjacent the extracting zone.

It will be apparent to those skilled in the art that many modifications and variations may be made to the preferred embodiments of the present invention, as set forth above, without departing substantially from the principles of the present invention. By way of example, drums and frames can be configured to accommodate various planting patterns and row widths. All such modifications and variations are intended to be included herein within the scope of the present invention, as defined in the claims that follow.

The invention claimed is:

1. A system for harvesting cotton from plants, said system comprising:

a header having an interior and mounting within the interior a first outer drum, a first inner drum, a second outer drum, a second inner drum and a third drum, the header further defining an extracting zone within the interior and between respective exteriors of the first outer drum, the second outer drum and the third drum;

the extracting zone operative to receive therein stalks of plants from which cotton is to be removed;

the first outer drum having first openings located on an exterior surface thereof, the first openings being sized and shaped to receive cotton therethrough, the first outer drum being operative to rotate such that sequential ones of the first openings are directed toward the extracting zone;

the first inner drum being positioned within an interior of the first outer drum, the first inner drum being non-rotating and operative to direct vacuum pressure toward the extracting zone such that only the first openings presently directed toward the extracting zone by rotation of the first outer drum receive vacuum pressure via the first inner drum;

the second drum having second openings located on an exterior surface thereof, the second openings being sized and shaped to receive cotton therethrough, the second drum being operative to rotate such that sequential ones of the second openings are directed toward the extracting zone;

the second inner drum being positioned within an interior of the second outer drum, the second inner drum being non-rotating and operative to direct vacuum pressure toward the extracting zone such that only the second openings presently directed toward the extracting zone by rotation of the second outer drum receive vacuum pressure via the second inner drum;

the third drum having third openings located on an exterior surface, the third openings being sized and shaped to receive cotton therethough, the third drum being non-rotating such that the third openings are continuously directed toward the extraction zone;

a source of vacuum pressure operative to direct vacuum pressure, via the first openings, the second openings and the third openings, toward the stalks of the plants received within the extracting zone such that cotton is removed from the stalks, drawn through the first openings, second openings and the third openings, away from the extracting zone, and into the first inner drum, second inner drum and third drum, respectively;

a first shield positioned outside the first outer drum, the first shield being operative to restrict an ability of the first openings of the first outer drum to permit access of the stalks to the interior of the first outer drum;

wherein the first shield has elongate and curved first arms spaced from each other and extending laterally from a first vertical post and along an exterior of the first outer drum such that each of the first arms is positioned between corresponding adjacent first openings of the first outer drum; and a second shield positioned outside the second outer drum, the second shield being operative to restrict an ability of the second openings of the second outer drum to permit access of the stalks to the interior of the second outer drum;

wherein the second shield has elongate and curved second arms spaced from each other and extending laterally from a second vertical post and along an exterior of the second outer drum such that each of the second arms is positioned between corresponding adjacent second openings of the second outer drum;

wherein the first outer drum, the second outer drum and the third drum are located such that a row of plants received within the extracting zone passes adjacent to the first outer drum, the second outer drum and the third drum; and wherein the first outer drum and the second outer drum are operative to rotate counter to each other.

2. The system of claim 1, wherein the first outer drum, the first inner drum, the second outer drum, the second inner drum and the third drum are each arranged in a vertical orientation.

3. The system of claim 1, wherein at least some of the first openings are located at different distances along a length of the first outer drum than others of the first openings.

4. The system of claim 1, further comprising a self-propelled harvesting implement to which the first outer drum, the first inner drum, the second outer drum, the second inner drum and the third drum and the source of vacuum pressure are mounted.

5. The system of claim 4, wherein rotational movement of the first outer drum and second outer drum relative to the extracting zone is synchronized with movement of the self-propelled harvesting implement.

6. The system of claim 5, wherein the rotational movement of the first outer drum and the second outer drum are oversped relative to movement of a stalk moving through the extracting zone such that movement of the respective openings of the first outer drum and second outer drum tends to urge cotton of the stalk into the respective openings.

7. The system of claim 1, wherein each of the first outer drum and the second outer drum has outwardly directed nozzles operative to direct the vacuum pressure toward the stalks of the plants received within the extracting zone such that cotton is removed from the stalks and drawn into the nozzles, the nozzles being operative to move relative to the extracting zone.

8. The system of claim 7, wherein the nozzles are operative to direct vacuum pressure toward the extracting zone only when the nozzles are located adjacent the extracting zone such that, responsive to one of the nozzles no longer being adjacent the extracting zone, vacuum pressure to that one of the nozzles is discontinued.

9. The system of claim 1, wherein each of the first arms and each of the second arms is a curved metal rod.

* * * * *